(12) United States Patent
Demarest et al.

(10) Patent No.: US 8,193,278 B2
(45) Date of Patent: Jun. 5, 2012

(54) PLASTICIZER FREE CAULKS AND SEALANTS HAVING IMPROVED AGED WET ADHESION

(75) Inventors: Victoria Anne Demarest, Flourtown, PA (US); Ann Elizabeth Evans, Coatesville, PA (US); Adam Wade Freeman, Chalfont, PA (US); Audrey Brenda Liss, Newtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/851,625

(22) Filed: Aug. 6, 2010

(65) Prior Publication Data

US 2011/0034621 A1 Feb. 10, 2011

Related U.S. Application Data

(60) Provisional application No. 61/273,714, filed on Aug. 7, 2009, provisional application No. 61/275,179, filed on Aug. 26, 2009.

(51) Int. Cl.
*C08L 43/02* (2006.01)

(52) U.S. Cl. ........ 524/547; 524/423; 524/425; 524/556; 524/561

(58) Field of Classification Search .............. 524/800, 524/804, 832, 547, 423, 425, 556, 561
See application file for complete search history.

(56) References Cited

U.S. PATENT DOCUMENTS

| | | | |
|---|---|---|---|
| 4,150,005 A | 4/1979 | Gehman | |
| 4,202,804 A * | 5/1980 | Porzel et al. | 524/13 |
| 4,855,349 A | 8/1989 | Ingle | |
| 5,120,785 A * | 6/1992 | Walker et al. | 524/423 |
| 6,403,703 B1 | 6/2002 | Slone | |
| 6,451,141 B1 | 9/2002 | Krobb | |
| 6,492,445 B2 * | 12/2002 | Siddiqui et al. | 524/156 |
| 2002/0160182 A1 | 10/2002 | Lorah | |
| 2003/0113460 A1 | 6/2003 | Even | |
| 2005/0043473 A1 | 2/2005 | Centner | |
| 2005/0070653 A1 * | 3/2005 | Apitz et al. | 524/417 |
| 2006/0052561 A1 | 3/2006 | Ander | |
| 2008/0152813 A1 | 6/2008 | Bowe | |
| 2011/0100256 A1 * | 5/2011 | Anderson et al. | 106/126.1 |

FOREIGN PATENT DOCUMENTS

| | | |
|---|---|---|
| EP | 0587332 A1 | 3/1994 |
| EP | 2281856 A1 * | 2/2011 |
| JP | 63099274 A | 4/1988 |
| JP | 2000063615 A | 2/2000 |
| JP | 2007269869 A | 10/2007 |
| WO | 9918157 A1 | 4/1999 |

* cited by examiner

*Primary Examiner* — Peter D. Mulcahy
*Assistant Examiner* — Henry Hu
(74) *Attorney, Agent, or Firm* — Andrew Merriam

(57) ABSTRACT

The present invention provides filled aqueous caulk and sealant compositions made from high solids aqueous binders chosen from copolymers having a mixture of backbone acid and hydroxyl groups that are copolymerized from 0.5 to 7.5 wt. %, based on total monomer weight, of an hydroxyl group containing monomer, and mixed backbone acid copolymers that are copolymerized from methacrylic acid (MAA) with a second acid monomer having a lower pKa than the pKa of MAA. Preferred, compositions comprise one or more organosilane exhibit the adhesion and joint movement capability required by ASTM C-920-08, as well as good weatherability and aged wet adhesion to glass, even at a filler to binder ratio of 0.2:1 to 4:1.

11 Claims, No Drawings

PLASTICIZER FREE CAULKS AND SEALANTS HAVING IMPROVED AGED WET ADHESION

This application claims the benefit of priority under 35 U.S.C. §119(e) of U.S. Provisional Patent Application No. 61/273,714 filed on Aug. 7, 2009 and U.S. Provisional Patent Application No. 61/275,179 filed on Aug. 26, 2009.

The present invention relates to filled aqueous caulks and sealants that are substantially free of any plasticizer and deliver a desirable property balance comprising copolymers having a mixture of backbone acids or a combination of acid and hydroxyl groups, and to uses thereof as caulks and sealants and the methods of using them. More specifically, it relates to filled aqueous caulks and sealants which comprise copolymers having mixed backbone acids and copolymerized from methacrylic acid and an acid monomer that has a lower pKa than methacrylic acid copolymers having a mixture of backbone acid and hydroxyl groups, and combinations thereof, wherein the copolymers further having a glass transition temperature ($T_g$) of $-25°$ C. or less. Formulations comprising the inventive filled sealants can comply with ASTM C-920-08, The Standard Specification for Elastomeric Joint Sealants (2008).

Caulks and sealants have been formulated to optimize flexibility and joint movement, adhesion across a variety of substrates, and long term durability (weathering). To enable ease of adjustment in their mechanical properties and improve their adhesion characteristics, known waterborne sealant formulations have included significant amounts of plasticizers. However, plasticizers, such as phthalates, benzoates and esters that are non-volatile in use, have proven expensive to use. In addition, plasticizers tend to migrate to the surface of the formulated sealant, thereby compromising mechanical properties, and leading to glossing, dirt pick up, mildew formation and discoloration of coatings applied over the sealant.

Fillers enable lower cost caulks and sealants, reduce tack and shrinkage, increase strength and provide color and opacity. Unfortunately, formulating filled caulks or sealants without plasticizers is a major challenge because omission of plasticizers generally compromises at least one of joint movement capability or wet adhesion properties tested in the sealant specification, ASTM C-920-08. The ASTM C0920-08 specification requires that architectural sealants have >22 N of wet adhesion to glass, aluminum and concrete mortar, after having been allowed to cure for three weeks followed by soaking for one week in water. In addition, ASTM C-920-08 requires that the sealant can meet the requirements of the specification after at least 6 months storage. A problem with filled waterborne caulks and sealants lacking plasticizers is that they tend to lose wet adhesion to glass as the wet sealant ages in the cartridge.

Known ways to provide desirable initial and aged wet adhesion in filled caulks and sealants include incorporating an organosilane adhesion promoter into the sealant formulation to promote adhesion between the polymeric binder and the intended application substrate.

U.S. Pat. No. 6,451,141B, to Krobb et al. (Krobb), discloses sealants and coatings that are essentially free from organic solvents, plasticizers and resins and which comprise an acrylate polymer A having a low molecular weight and an acrylate copolymer B that has a glass transition temperature ($T_g$) of from $-50$ to $50°$ C. However, the Krobb compositions comprise two separately made polymers rather than polymers made in a single polymerization process. Further, the Krobb polymer A could not be made by emulsion or aqueous dispersion polymerization without the use of undesirably high amounts of chain transfer agents. Instead, polymer A is made via solvent polymerization in volatile organic compounds (VOCs) so that the solvent then must be removed. Alternatively, if polymer A comprises vinyl ester-olefin copolymer, it must be made using expensive high pressure equipment.

The present inventors have endeavored to solve the problem of providing a filled aqueous caulk or sealant that is substantially free of any plasticizer and yet exhibits desirable joint movement properties, wet adhesion to glass, mortar and aluminum, and aged wet adhesion to glass, without compromising long term weatherability and without the added difficulty, expense or equipment of adding low molecular weight polymers to the com According to the present invention, aqueous caulks and sealants that are substantially free of any plasticizer comprise (i) aqueous binder of one or more copolymer chosen from a mixed backbone acid copolymer copolymerized from methacrylic acid (MAA) and a second acid monomer having a lower pKa than methacrylic acid and chosen from a monocarboxylic acid, dicarboxylic acid, phosphorus acid, sulfur acid, and mixtures thereof, the MAA and the second acid monomer being copolymerized in the amount of from 0.1 to 5.0 wt. %, based on total copolymerized monomer weight, preferably, 3.0 wt. % or less, a copolymer having a mixture of backbone acid and hydroxyl groups copolymerized from 0.5 to 7.5 wt. %, based on total copolymerized monomer weight, of the one or more hydroxyl group containing monomer, preferably, 5.0 wt. % or less, and from 1.0 to 5.0 wt. %, based on total copolymerized monomer weight, of one or more acidic monomer chosen from MAA and the second acid monomer, and copolymer mixtures thereof, wherein the copolymer has a glass transition temperature ($T_g$) of $-25°$ C. or less, or $-30°$ C. or less, or, preferably, $-35°$ C. or less, wherein in the aqueous binder is copolymerized from no more than one second acid monomer chosen from phosphorus acid and sulfur acid, (ii) one or more filler in a filler to binder ratio of 0.2:1 or higher, or up to 4:1, and, (iii) water. The compositions are substantially free of plasticizer, and, preferably, comprise 0.8 wt. % or less of plasticizer, based on the total weight of the composition.

In one embodiment, the aqueous caulks and sealants further comprise one or more organosilane adhesion promoter, such as an epoxysilane.

In an embodiment of the aqueous binder, mixed backbone acid copolymers are copolymerized from mono- or di-carboxylic acid as the one or more second acid monomer in a weight ratio of MAA to the second acid monomer ranging from 5.5:1 to 1:5, preferably, 3:1 or less, or, preferably, 1:3 or more, or, more preferably, 1:1 or less, and include mixtures thereof, and mixtures thereof with copolymers having a mixture of backbone acid and hydroxyl groups In another embodiment of the aqueous binder, mixed backbone acid copolymers of the present invention are copolymerized one or more sulfur acid or phosphorus acid monomer as the second acid monomer, such as PEM, in a weight ratio of the MAA to the second acid monomer ranging from 9:1 to 2.2:1, or 2.5:1 or more, preferably 3:1 or more, or, preferably, 6:1 or less, and include mixtures thereof, and mixtures thereof with one or more copolymer having a mixture of backbone acid and hydroxyl groups.

In an embodiment of the aqueous binder, copolymers having a mixture of backbone acid and hydroxyl groups are copolymerized from one or more hydroxyl group containing monomer and one or more acidic monomer in a weight ratio ranging from 5:1 to 1:5, preferably, 3:1 or less, or, preferably, 1:3 or more, or, more preferably, 1:1 or less, and include mixtures thereof and mixtures thereof with one or more mixed backbone acid copolymer.

In an embodiment of the aqueous binder copolymers having a mixture of backbone acid and hydroxyl groups present invention, the aqueous binder copolymers are copolymerized from acidic and/or hydroxyl group containing monomers with nonionic acrylic and vinyl monomers, such as $C_1$ to $C_{30}$ alkyl (meth)acrylates. In this embodiment of the present invention, the aqueous binder copolymers are copolymerized from no more than 12.5 wt. % of monomers containing hydrophilic groups, such as acid, hydroxyl, amine, and thiol groups, based on total monomer weight.

In the aqueous caulks and sealants of the present invention, the aqueous binder copolymers have solids contents of 50 wt. % or higher, preferably, 60 wt. % or higher, or up to 70 wt. % based on the total weight of the aqueous binder copolymer. Preferably, the aqueous binder copolymers are bimodal or polymodal copolymers.

In another embodiment, to improve dirt pickup resistance and stain resistance, avoid a tacky product when dried, and retain flexibility in use the aqueous caulk and sealant compositions consist essentially of compositions free of tackifiers.

In accordance with another embodiment of the present invention, uses of the aqueous caulk and sealant composition comprise uses as or kits comprising a caulk or sealant, such as in a squeeze tube, a cartridge or sausage pack adapted for use with a caulk gun, a pressurized, gunless applicator, or in a pail, adapted for use with a bulk applicator.

In yet another embodiment, methods comprise applying the aqueous caulk and sealant of the present invention to a substrate chosen from glass, mortar, aluminum, wood, vinyl, fiber cement, brick, concrete block, painted surfaces, combinations thereof, joints therein, seams therein, gaps therein, joints between substrate pieces and gaps between substrate pieces.

In yet still another embodiment, products comprise the substrates of the present invention treated with aqueous caulk and sealant of the present invention.

All ranges are inclusive and combinable. For example, an amount of acidic monomer ranging up to 5.0 wt. %, based on the total monomer weight, that may range 0.1 wt. % or higher, or 0.3 wt. % or higher preferably, 3.0 wt. % or less, or, more preferably, 2.0 wt. % or less includes ranges of from 0.1 to 5.0 wt. %, from 0.1 to 2.0 wt. %, from 0.1 to 3.0 wt. %, from 0.1 to 0.3 wt. %, from 0.3 to 2.0 wt. %, from 0.3 to 3.0 wt. %, from 0.3 to 5.0 wt. %, from 2.0 to 5.0 wt. %, from 2.0 to 3.0 wt. % and from 3.0 to 5.0 wt. %.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

Unless otherwise specified, all temperature units refer to room temperature (~20-22° C.) and all pressure units refer to standard pressure.

As used herein, the phrase "aqueous" includes water and mixtures comprising 50 wt. % or more of water in a mixture of water with water-miscible solvents that are volatile in use conditions.

As used herein the phrase "bimodal copolymer" or "polymodal copolymer" refers to copolymers having a particle size distribution (PSD) wherein the particles are of varying size with two (bimodal) or more (polymodal) distinct maxima in a particle size distribution curve (wt % or intensity=y axis; size=r×axis). A dispersion having a very broad PSD, which may or may not have any discernible maxima, is considered as having a polymodal PSD.

As used herein the phrase "glass transition temperature" or "$T_g$" refers to the glass transition temperature of a material as determined by Differential Scanning Calorimetry (DSC) scanning from −90° C. to 150° C. at a rate of 20° C./min. The $T_g$ is the inflection point of the curve of heat flow vs. temperature or the maximum value on the plot of its derivative.

As used herein the phrase "filler to binder ratio" refers to the total weight of fillers and pigments to the total weight of aqueous binder solids (copolymer).

As used herein the phrase "nonionic monomer" refers to any monomer such that the copolymerized monomer residue of which does not bear an ionic charge under conditions of use and over the pH range of pH 2-12.

As used herein, unless otherwise indicated, the phrase "polymer" includes homopolymers, and the phrase "copolymer" refers to any polymers made from two or more different monomers, including terpolymers, block copolymers, segmented copolymers, multi-staged copolymers, graft copolymers, and any mixture or combination thereof.

As used herein the phrase "substantially free of any plasticizer" refers to any composition which comprises 1 wt. % or less of plasticizer, based on the total weight of the composition.

As used herein, the phrase "weight average particle size" refers to the weight average particle size of a material as determined using capillary hydrodynamic fractionation (CHDF) with a Matec CHDF 2000 chromatography system (Matec Applied Sciences, Northborough, Mass.).

As used herein the phrase "weight average molecular weight" refers to the weight average molecular weight of a polymeric material as determined using a size exclusion chromatography (SEC) or gel permeation chromatography (GPC) technique with an Agilent A1100 liquid chromatography system with system control (Agilent, Santa Clara, Calif.). Data acquisition and processing were done with Agilent GPC Data Analysis Software for Agilent Chemstation. Samples were prepared by dissolving the latex sample in tetrahydrofuran (THF) to a concentration of around 1 mg/mL, filtered through a 0.45 μm PTFE filter, the separated on the above-described system. Relative molecular weights of the samples was calculated using a linear calibration curve determined by Easi-Cal with PS-1 polystyrene standards of from MW 580 to 7,500,000 from Polymer Laboratories (Varian, Inc., Palo Alto, Calif.) converted to pMMA.

The present invention provides a filled caulk or sealant composition that is substantially free of any plasticizer and exhibits desirable aged wet adhesion to glass and joint movement in use. The composition comprises a low $T_g$ aqueous binder of one or more copolymer copolymerized from MAA and a second acid monomer having a lower pKa than MAA and copolymers having a mixture of backbone acid and hydroxyl groups to enable good joint movement. Further, the present inventors have found that such aqueous binders with certain functional groups can allow flexibility and joint movement without limiting aged wet adhesion to glass or weatherability.

Preferred filled caulks and sealants of the present invention meet the Class 25 joint movement and adhesion requirements of the ASTM C-920-08 specification, exhibit good aged wet adhesion to glass and good weatherability under accelerated conditions. The ASTM C920-08, Standard Specification for Elastomeric Joint Sealants, establishes classes of sealants that can alternately compressed and extended to a predefined proportion of its original dimensions. Higher class number sealants meet more demanding criteria than lower class number sealants Class 25 sealants, for example, are able to withstand cyclic movement of +25% and −25% from the original 12.2 mm joint width dimensions. ASTM C-920-08 (2008) also requires sealants to have a minimum wet peel adhesion value of 22 N to glass, aluminum and concrete mortar. The present invention enables one to provide caulks and sealants meeting the desired criteria by including one or more silane and by varying filler to binder ratios, with lower filler content improving performance.

The one or more aqueous binder is chosen from mixed backbone acid copolymers copolymerized from MAA with one or more second acid monomer, copolymers having a mixture of backbone acid and hydroxyl groups copolymerized from one or more acidic monomer chosen from MAA and the second acid monomer and hydroxyl group containing monomers. The addition of a hydroxyl group to the aqueous binder copolymer backbone provides an additional route to stable wet adhesion to hydroxyl rich surfaces, such as glass, and generally improves binder weathering characteristics.

To achieve the desired flexibility, joint movement, aged wet adhesion and weatherability, the total amount of acidic monomers used to make binder copolymers is 5.0 wt. % or less, based on the total weight of monomers, and, if used, the amount of hydroxyl group containing monomers is 7.5 wt. % or less.

To insure acceptable weatherability in the composition, in the aqueous binders the relative amount of MAA to the second acid monomer or to the hydroxyl group containing monomer used to make the aqueous binder copolymer should be limited. Suitable copolymers include mixed backbone acid copolymers copolymerized from second acid monomers chosen from monocarboxylic acids, di-carboxylic acids in the weight ratios stated above, phosphorus acids and sulfur acids, copolymers having a mixture of backbone acid and hydroxyl groups copolymerized from hydroxyl group containing monomers and acidic monomers in the weight ratios stated above. Combinations of any and all such copolymers are included.

In one embodiment, aqueous binder copolymers are copolymerized from a mixture of acids in the polymer backbone, such as, for example, mixtures of methacrylic acid (MAA) and acidic monomers having a pKa lower than MAA ($\leq$4.3) chosen from monocarboxylic acids, dicarboxylic acids, and sulfur acids and phosphorous acids.

In another embodiment, aqueous binder copolymers have backbone acid and hydroxyl groups and are copolymerized from one or more ethylenically unsaturated hydroxyl group containing monomer, such as a hydroxyalkyl (meth)acrylate, preferably, 2-hydroxyethyl methacrylate (HEMA), 3-hydroxypropyl (meth)acrylate, 2,3-dihydroxypropyl(meth) acrylate.

Other than MAA, the acidic monomers including second acid monomers and acidic monomers copolymerized with hydroxyl group containing monomers may be chosen from and any acidic monomer with a pKa lower than the pKa of MAA, i.e. a pKa of 4.3 or lower. Suitable mono- and dicarboxylic acid monomers may include, for example, acrylic acid (AA), itaconic acid (IA), maleic acid (MA), and fumaric acid (FA), and salts thereof. Suitable sulfur acid containing monomers may include, for example, styrene sulfonate and acrylamidopropane sulfonate and their salts. Suitable phosphorus containing acids may include, for example, any phosphorus containing acids possessing at least one POH group in which the hydrogen atom is ionizable, and their salts, such as phosphoalkyl (meth)acrylates like 2-phosphoethyl methacrylate (PEM), di-, tri-, or poly-phosphate ester group containing (meth)acrylates; alkylvinyl phosphonates and their salts; monomers containing groups formed from phosphinic acid, phosphonic acid, phosphoric acid, pyrophosphinic acid, pyrophosphoric acid, partial esters thereof, and salts thereof. Preferably, the second acid is chosen from acrylic acid, itaconic acid and/or PEM when the first acid is MAA.

Suitable binder copolymers are copolymerized from total amounts of one or more acidic monomer ranging up to 5.0 wt. %, based on total copolymerized monomer weight, or 0.1 wt. % or higher, or 0.3 wt. % or higher, or 0.5 wt. % or higher, preferably, 3.0 wt. % or less, or, more preferably, 2.0 wt. % or less.

Suitable binder copolymers having a mixture of backbone acid and hydroxyl groups may be copolymerized from total amounts of one or more hydroxyl group containing monomer ranging up to 7.5 wt. %, based on the total monomer weight, or 0.5 wt. % or higher, preferably, 5.0 wt. % or less, or, more preferably, 2.0 wt. % or less.

According to the present invention, the binder copolymers have a glass transition temperature ($T_g$) of −25° C. or less, or −30° C. or less, or, preferably, −35° C. or less. Accordingly, the binder copolymers may be formed from any nonionic acrylic or vinyl monomer or combination that will, when copolymerized with the acid and/or hydroxyl group containing monomers provide copolymers with such a $T_g$. Suitable such as $C_1$ to $C_{30}$ alkyl(meth)acrylates, styrene and methyl styrene, preferably butyl acrylate (BA), 2-ethylhexyl acrylate (2-EHA), ethyl acrylate (EA), butyl methacrylate (BMA), methyl methacrylate (MMA) and dodecyl methacrylate and octadecyl methacrylate.

The aqueous binder copolymers of the present invention have solids contents of 50 wt. % or higher, based on the total weight of the aqueous copolymer, or, preferably, 60 wt. % or higher, or up to 70 wt. %. Preferably, the aqueous binder copolymers are bimodal or polymodal copolymers.

The aqueous binder copolymers may be made via conventional emulsion or dispersion polymerization methods. In the polymerization, known emulsifiers and/or dispersants may be used. such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature may be maintained at a temperature lower than 100° C. throughout the course of the reaction, preferably from 30° C. to 95° C. The monomer mixture may be added neat or as an emulsion in water. The monomer mixture may be added in one or more additions, such as in shot or multiple shot polymerization, or semi-continuously e.g. via gradual addition methods, either linearly or not linearly, over the reaction period, or any combination thereof.

Conventional free radical initiators may be used such as, for example, hydrogen peroxide, t-butyl hydroperoxide, cumene hydroperoxide, ammonium and/or alkali metal persulfates, perborate salts and, perphosphoric acid and salts thereof, potassium permanganate, and ammonium or alkali metal salts of peroxydisulfuric acid, at levels of 0.01 to 3.0 wt. %, based on the total weight of monomer. Redox systems using such initiators coupled with a suitable reductant such as, for example, sodium sulfoxylate formaldehyde (SSF); (iso)ascorbic acid; alkali metal and ammonium salts of sulfur-containing acids, such as sodium sulfite, bisulfite, thiosulfate, hydrosulfite, (hydro)sulfide, or dithionite; sulfinic acids or their salts; amines such as ethanolamine; weak acids such as glycolic acid, lactic acid, malic acid, tartaric acid and salts thereof. In addition, redox reaction catalyzing metal salts, such as those of iron, copper, nickel, or cobalt may be used.

Bimodal or polymodal aqueous binder copolymers can be made by known in-situ preparation methods to form copolymers of differing size, such as dual seed copolymerization, or two stage, two shot, multiple stage or multiple shot methods wherein each shot or stage may comprise the same or a different monomer mixture within the scope of the present invention. For example, pH may be raised during polymerization to reduce the PSD of already formed copolymer particles, such as, for example, while adding a second or subsequent shot or monomer feed (stage); surfactant or emulsifier can be added for the first time, or their concentration can be varied with addition of at least one shot or stage to reduce the PSD of copolymer particles formed thereafter. Alternatively, but not preferably, bimodal or polymodal polymers can be prepared by blending preformed monomodal latices of different particle size.

Examples of in-situ preparation are described in U.S. Pat. No. 4,254,004, U.S. Pat. No. 4,539,361, U.S. Pat. No. 4,780,503, and U.S. Pat. No. 5,430,092. U.S. Pat. No. 4,254,004 discloses a method of preparing bimodal particle sizes based on differential monomer feed rates. In U.S. Pat. No. 4,539,361 a small sized seed latex is added during emulsion polymerization. In U.S. Pat. No. 4,780,503 an extra shot of anionic surfactant is added during emulsion polymerisation. In U.S. Pat. No. 5,430,092, the monomers and up to 10 wt. %, based on total monomers plus latex polymer solids, of a small sized polymer latex is charged to a reactor prior to the start of emulsion polymerization, and after a major portion of the monomers are polymerized, an additional feed of one or more monomer is added while polymerization is completed.

In a preferred embodiment, aqueous binder copolymers are formed in dual seed copolymerization wherein a single shot or gradual addition (feed) of monomers are polymerized in the presence of a seed latex shot, and another seed latex particle is added later in a separate shot. In examples of such methods, the monomers may be addition polymerized in the presence of one or more aqueous dispersion of a seed polymer made from addition polymerizable monomers having a very small average particle size, e.g. 100 nm or less, or 50 nm or less, followed by adding another seed of a similar average particle size at a later time.

Multimodal copolymers may also be formed by multiple seed polymerization, wherein three or more seed latices are added as a shot at various times during polymerization of one or more shot or feed of monomers.

In some embodiments, to achieve a desired balance of mechanical properties and to improve the adhesion of the aqueous binder copolymer, chain transfer agents, such as n-dodecyl mercaptan (nDDM), may be added. Other suitable chain transfer agents may include, for example, halogen compounds such as tetrabromomethane; mercaptans such as alkyl thioglycolates, alkyl mercaptoalkanoates, and alkyl mercaptans. Chain transfer agent(s) may be added in one or more additions or continuously, linearly or not, over most or all of the entire reaction period or during limited portion(s) of the reaction period such as, for example, in the kettle charge and in the reduction of residual monomer stage. The chain transfer agents may optionally be added in conventional amounts, such as from 0.01 to 5 wt. %, based on the total weight of monomers and initiators.

Preferably, chain transfer agents are added during the last 25% to 50% of total polymerization time.

Following polymerization, initiators, optionally combined with reducing agents, may be used to minimize residual monomer content. In some cases the choice of initiator and accompanying chemicals, their level and method of addition, and the temperature can be chosen to affect a desired balance of the mechanical properties in the final binder. This process may be carried out in the same reaction or in a different vessel or kettle as was used for the polymerization.

The aqueous binder copolymers can comprise a single stage or multiple stage copolymers and can have any known morphology, such as where the core is not completely encapsulated in the shell. Suitable aqueous binder copolymers may have weight average particle sizes ranging from 300 nm to 1 µm, preferably 400 nm or more, or, preferably 800 nm or less.

Suitable aqueous binder copolymers may have weight average molecular weights ranging from 50,000 or more, preferably, 75,000 or more. The upper limit of molecular weight is generally not limited and depends on the polymerization method used.

The aqueous caulk or sealant compositions may be prepared by techniques which are well known in the sealants art. For example, the aqueous binder is added directly to a kettle, followed by additional ingredients and, lastly, by the filler and pigment. Mixing may be done in a high shear mixer with a sweep arm designed to pull the high viscosity sealant into the center of the mixer, or in a planetary mixer, with or without a high speed disperser blade. After all of the ingredients are added, the sealant is allowed to mix under a vacuum of 750 mm Hg or lower to remove entrapped air from the final product.

The aqueous caulks and sealants may have filler to binder (solids weight) ratios of from 0.04:1 to 4:1. To achieve Class 25 performance in the absence of plasticizer, caulks and sealants may have a filler to binder ratio of 2:0:1 or less, or preferably 0.2:1 or more. To achieve higher or lower levels of performance according to ASTM C-920-08, binder to filler ratios can be adjusted, respectively, down or up.

Suitable fillers may include, for example, alkaline earth metal sulfates or carbonates, such as, for example, barites, calcium carbonate, calcite and magnesium carbonate; silicates, such as, for example, calcium silicates, magnesium silicates, and talc; metal oxides and hydroxides, such as, for example, titanium dioxide, alumina and iron oxides; diatomaceous earth; colloidal silica; fumed silica; carbon black; white carbon black; nutshell flour; natural and synthetic fibres (especially plaster fibres); and scrap or recycled plastics in the form of dust, flakes or flour; hollow or solid ceramic, glass or polymeric microspheres.

To enable improved adhesion, especially to glass, the caulks and sealants may comprise one or more organosilane adhesion promoter in amounts ranging from 0.001 to 5 wt. %, based on the total weight of the composition, preferably, 0.01 wt. % or more, or, preferably, up to 1.0 wt. %, or, more preferably, up to 0.5 wt. %.

Suitable organosilanes may include, for example, any hydrolyzable or alkoxy functional organosilanes, such as, for example, trialkoxysilanes; aminoalkylsilanes or aminoalkoxysilanes, such as γ-aminopropyl triethoxysilane and N-(dimethoxymethylsilylisobutyl)ethylenediamine; epoxy functional alkoxysilanes, such as glycidyl propoxymethyl dimethoxysilane, γ-glycidoxypropyl-methyl-diethoxysilane, γ-glycidoxypropyl trimethoxysilane, and β-(3,4-epoxycycyclohexyl)ethyl trimethoxysilane; (meth)acryloyl alkoxysilanes, such as γ-methacryloxypropyl trimethoxysilane; vinyltriethoxysilane, and γ-mercaptoalkoxysilanes.

To enable improved filler dispersion and uniformity in the composition, the aqueous caulks and sealants may comprise one or more dispersant which can be an organic dispersant, e.g. a carboxylic acid (co)polymer, such as poly(methacrylic acid), or inorganic dispersant, such as alkali(ne) metal salts of tripolyphosphates, metaphosphates and their salts, and hexametaphosphates and their salts. Suitable amounts of dispersants may range from 0.01 to 5 wt. %, based on the total weight of the composition, preferably, 0.02 to 2 wt. %, or, more preferably, 0.1 to 1.0 wt. %.

Solvents may be added to improve tooling in use, increase open time (storage stability) and to better disperse additives, such as the silanes. Suitable solvents may include, for example, mineral spirits, turpentine, mineral oil, and (poly) alkylene glycols.

The compositions of the present invention may also include other additives conventionally employed in caulks and sealants, such as, for example, free-thaw stabilizers, drying oils, biocides, rheology modifiers or thickeners, such as cellulosics, kaolin, polyacrylic acids and polyurethane thickeners, antifoamants, colorants, waxes and anti-oxidants.

Surfactants and emulsifiers commonly used in emulsion polymerization may be present. These include anionic, nonionic, and cationic surfactants, such as, for example, nonionic surfactants, like alkylphenol ethoxylates (APEO) or APEO-free surfactants. In one embodiment, surfactants can be added to the latices during synthesis as post additives.

The compositions of the present invention are suitable for uses including caulks, sealants and construction adhesives, such as by applying the caulk and sealant to a substrate from a cartridge and allowing it to dry. Caulks and sealants can be applied to various substrates including wood, glass, metal, masonry, vinyl, brick, concrete block, fiber cement, gypsum, stone, tile and asphalt. Uses may include caulking and sealing windows, doors, fixtures, paneling, molding, finished walls and ceilings, and any gap, seam or joint therein or between substrate pieces, such as in tilt-up construction and chinking applications

EXAMPLES

The following examples illustrate, but do not limit, the present invention. In the examples, the following chemical abbreviations are used: AA: Acrylic Acid; AN: Acrylonitrile; BA: Butyl Acrylate; EA: Ethyl Acrylate; EHA: 2-Ethylhexyl Acrylate; HEMA: 2-Hydroyethyl Methacrylate; IA: Itaconic Acid; MAA: Methacrylic Acid; MMA: Methyl Methacrylate; nDDM: n-Dodecyl Mercaptan; PEM: 2-Phosphoethyl Methacrylate; SSF: Sodium Sulfoxylate Formaldehyde; TBHP: tert-Butyl Hydroperoxide; TAHP: tert-Amyl Hydroperoxide; IAA: D-Isoascorbic Acid; FF6: Bruggolite™ FF6 M, a mixture of 2-hydroxy-2-sulfonatoacetic acid and 2-hydroxy-2-sulfinatoacetic acid (L. Brüggemann KG, Heilbronn, DE); $Na_4EDTA$: Ethylene Diamine Tetraacetic Acid Tetrasodium salt; $FeSO4$: Ferrous Sulfate; SDBS: sodium dodecylbenzene sulfonate.

The comonomers listed for each of the emulsion copolymers were combined in the proportions listed in Table 1, 2, and 3, below General Synthesis of Copolymers (For Copolymers N, O, P, and Q):

To form the each monomer emulsion, 2160 g the comonomers listed in Table 1, 2, and 3 were combined in the proportions listed with 252 g deionized (DI) water, 6.6 g (solids) of SDBS, and emulsified with stirring. 626 g of DI water was charged to a 5 L multineck flask reactor fitted with mechanical stirring and the contents were heated to 86° C. under nitrogen. The flask was then charged with a solution of 6.2 g of ammonium persulfate dissolved in 20 g DI water, and 15 g (solids) of 100 nm seed latex with a total of 39 g of DI water.

Subsequently, gradual addition of the monomer emulsion was begun over 90 minutes, and, concurrently, a separate solution of 2.6 g of ammonium persulfate in 90 g DI water was fed into the flask. After approximately 47% of the monomer emulsion was added, the flask was charged with 21.7 g (solids) of 65 nm seed latex together with a total of 50 g DI water.

The reaction temperature was maintained at 85° C. throughout polymerization. After adding the monomer emulsion, 27 g of DI water was used to rinse the monomer emulsion feed line to the reactor, and the reactor contents subsequently partially neutralized with aqueous ammonia, and cooled to 75° C. Then, 3 ppm of $FeSO_4$, 3 ppm ($Na_4EDTA$), 3.5 g (solids) of TAHP, and 1.8 g FF6, dissolved in 35 g DI water, were subsequently added. After cooling to 65° C., an additional 1.7 g (solids) of TAHP and 1.0 g of FF6, each dissolved in 16 g DI water were added. Cooling was continued to a temperature of 40° C., at which point 0.18 g (solids) of Kathon™ LX biocide (The Dow Chemical Company, Midland, Mich.) in a total of 53 g of DI water was added. The final weight solids of the bimodal emulsion copolymer were 62-63%, consisting of approximately 90% of particles having sizes of 450 nm and 10% 140 nm.

General Synthesis for Copolymers No. 2 (For Copolymers MM, OO, PP, QQ, TT, UU, VV, WW, XX, HHH, III and LLL):

The emulsion copolymers were made as described in the General Synthesis for Copolymers, above, except that once the emulsions were cooled to 75° C. they were treated with a combination of 3 ppm of ferrous sulfate, 0.5 g (solids) TBHP and 0.3 g of IAA, each dissolved in 17 g DI water instead of TAHP, FF6, $Na_4$ EDTA and $FeSO_4$. Still further, after cooling to 65° C., an additional 2.7 g (solids) TBHP and 1.6 g of IAA, each dissolved in 42 g of DI water were added instead of TAHP and FF6. At a temperature of 40° C., 21 g (solids basis) of Triton™ X-405 octylphenyl ethoxylate surfactant (The Dow Chemical Company, Midland, Mich.) was charged simultaneously with the Kathon™ LX.

General Synthesis for Copolymers No. 3 (For Copolymers C, D, E, F, and G):

The emulsion copolymers were made as described in the General Synthesis for Copolymers, above, except that 4.3 g (solids) of Aerosol™ A-102 Disodium ethoxylated alcohol, a C10-C12 half ester of sulfosuccinic acid (Cytec Industries, Inc. West paterson, N.J.) was added in addition to 1.9 g (solids) SDBS. After adding the monomer emulsion, the contents of the flask were treated with a combination of 2 ppm $FeSO_4$ and 2 ppm $Na_4EDTA$, 0.5 g (solids) of TBHP and 0.5 g of SSF dissolved in 13 g DI water, instead of TAHP and FF6, at 84° C. Further, after cooling to 65° C. an additional 2.0 g (solids) TBHP and 1.6 g of SSF, dissolved in 20 and 42 g DI water, respectively, were added and not TAHP and FF6.

TABLE 1

Aqueous Binder Emulsion Copolymers

| Copolymer | BA | MMA | HEMA | MAA | AA | IA | PEM |
|---|---|---|---|---|---|---|---|
| C* | 96.6 | | | | | | 3.2 |
| D* | 98.2 | | | | 1.8 | | |
| E* | 98 | | | 2 | | | |
| F* | 97.7 | | | 1.5 | | | 0.8 |
| G* | 97.7 | | | | 1.5 | | 0.8 |
| H | 94 | 2 | 2 | 2 | | | |
| I | 94 | 2 | 2 | 2 | | | |
| J | 94 | 2 | 2 | | 2 | | |
| K | 94 | 2 | 2 | | | 2 | |
| L | 94 | 2 | 2 | | | 2 | |

TABLE 1-continued

Aqueous Binder Emulsion Copolymers

| Copolymer | BA | MMA | HEMA | MAA | AA | IA | PEM |
|---|---|---|---|---|---|---|---|
| M | 94 | 2 | 2 | | 2 | | |
| N | 96 | 2 | | 1 | 1 | | |
| O | 96 | 2 | | 1.5 | 0.5 | | |
| P* | 97 | 2 | | | | 1 | |
| Q | 96 | 2 | | 1.75 | | | 0.4 |
| R* | 96.75 | 2 | | | 1.25 | | |
| S | 96.75 | 1 | 1 | | 1.25 | | |
| T | 96.75 | | 2 | | 1.25 | | |
| U* | 99.625 | | | | | 0.375 | |
| V | 95.75 | | 3 | | 1.25 | | |
| W* | 97.25 | 2 | | | 0.75 | | |
| X* | 96 | 2 | | 1.75 | 0.25 | | |
| Y | 96 | 1 | 1 | 1.75 | 0.25 | | |
| Z | 96 | | 2 | 1.75 | 0.25 | | |

*Comparative;
Note:
The $T_g$ of all copolymers was measured to be between −41 and −47° C.

General Synthesis of Copolymers No. 4 (Copolymers AA, EE, AAA, BBB, EEE, FFF, KKK, NNN, and OOO:

The emulsion copolymers were prepared as described in General Synthesis of Copolymers, above, except that after copolymerization 21 g (solids basis) of Triton™ X-405 octylphenyl ethoxylate surfactant (The Dow Chemical Company, Midland, Mich.) was charged simultaneously with the Kathon™ LX.

General Synthesis of Copolymers No. 5 (Copolymers H, I, J, K, L, and M):

The emulsion copolymers were prepared as described in General Synthesis of Copolymers, above, except that 1.08 g of n-dodecyl mercaptan (n-DDM) was charged into the monomer emulsion after about 75% of the monomer emulsion had been fed into the flask.

General Synthesis of Copolymers No. 6 (Copolymers R to Z, BB, CC, DD, GG, HH, II, JJ, and KK):

The emulsion copolymers were prepared according to General Synthesis of Copolymers No. 5, except that after copolymerization 21 g (solids basis) of Triton™ X-405 octylphenyl ethoxylate surfactant (The Dow Chemical Company, Midland, Mich.) was charged simultaneously with the Kathon™ LX.

General Synthesis of Copolymers No. 7 (Copolymers NN, and GGG): These emulsion copolymers were prepared as described in General Synthesis of Copolymers No. 2, except that 1.08 g of n-dodecyl mercaptan (n-DDM) was charged into the monomer emulsion after about 75% of the monomer emulsion had been fed into the flask.

TABLE 2

Aqueous Binder Emulsion Copolymers

| Copolymer | BA | EA | EHA | MMA | HEMA | MAA | AA | IA |
|---|---|---|---|---|---|---|---|---|
| AA | 96 | | | | 2 | 1.75 | 0.25 | |
| BB | 95 | | | | 3 | 1.75 | 0.25 | |
| CC | | 46 | 50 | | 2 | | 2 | |
| DD | | 47 | 50 | | 2 | | 1 | |
| EE | | 47 | 50 | | 2 | | 1 | |
| GG* | 96.25 | | | 2 | | 1.5 | | 0.25 |
| HH | 96.25 | | | 1 | 1 | 1.5 | | 0.25 |
| II | 96.25 | | | | 2 | 1.5 | | 0.25 |
| JJ | 95.25 | | | | 3 | 1.5 | | 0.25 |
| KK* | 97.5 | | | | 2 | | | 0.5 |
| MM | 94 | | | | 5 | | 1 | |
| NN | 96 | | | 2 | | 1.5 | 0.5 | |
| OO | 95 | | | 2 | 2 | | 1 | |
| PP | 92 | | | 2 | 5 | | 1 | |
| QQ* | 89 | | | | 10 | | 1 | |
| TT | 94 | | | 2 | 2 | 1.5 | 0.5 | |
| UU | 91 | | | 5 | 2 | 1.5 | 0.5 | |
| VV | 91 | | | 2 | 5 | 1.5 | 0.5 | |
| WW | 93 | | | | 5 | 1.5 | 0.5 | |
| XX* | 88 | | | | 10 | 1.5 | 0.5 | |

*Comparative;
Note:
The $T_g$ of all copolymers was measured to be between −41 and −47° C. except for copolymers C, DD and EE wherein the $T_g$ was measured to be between −36 and −38° C.

TABLE 3

Aqueous Binder Emulsion Copolymers

| Copolymer | BA | MMA | HEMA | MAA | AA |
|---|---|---|---|---|---|
| AAA | 96 | 2 | | 1.25 | 0.75 |
| BBB | 94 | 2 | 2 | 1.25 | 0.75 |
| CCC | 95 | 2 | | 2.25 | 0.75 |
| DDD | 94 | 2 | | 3 | 1 |
| EEE | 93 | 2 | 2 | 2.25 | 0.75 |
| FFF | 92 | 2 | 2 | 3 | 1 |
| GGG | 94 | 2 | 2 | 0.5 | 1.5 |
| HHH | 94 | 2 | 2 | 1.25 | 0.75 |
| III | 96 | 2 | | 1.25 | 0.75 |
| JJJ | 94 | 2 | 2 | 0.5 | 1.5 |
| KKK | 93.5 | 2 | 3 | | 1.5 |
| LLL | 94 | 2 | 2 | 0.5 | 1.5 |
| NNN | 94.5 | 2 | 2 | | 1.5 |
| OOO | 94 | 2 | 2 | 0.5 | 1.5 |

Note:
The $T_g$ of all copolymers was measured to be between −41 and −47° C.

Formulation:

Caulk and sealant compositions for testing were formulated as a mixture of 47.1 weight parts aqueous binder copolymer (63 wt. % solids) with 1.5 weight parts water, 0.9 weight parts octylphenyl ethoxylate surfactant, 0.7 weight parts ethylene glycol, 0.14 weight parts acrylic acid dispersant, 0.12 weight parts potassium tripolyphosphate dispersant, 0.5 weight parts cellulosic thickener, 0.12 weight parts isothiazolone in-can preservative, 2.7 weight parts odorless mineral spirits, 0.03 weight parts of γ-glycidoxypropyl-methyl-diethoxysilane, 44.5 weight parts of calcium carbonate, 1.5 parts of titanium dioxide, and 0.1 weight parts ammonia, and mixing for 30 minutes under a vacuum in a Ross (Charles Ross & Son Company, Hauppauge, N.Y. 11788) planetary mixer.

Test Methods:

Weathering: Specimens were made by gunning sealant into metal frames (with 127×38×3.2 mm inside dimensions) resting on 76×152 mm aluminum panels and striking the sealant flat with a metal straight edge. The sealant plaques were cured for three days at 23±2° C., 50±5% relative humidity, and then placed in an Atlas Ci65A Xenon Weather-Ometer (Atlas Material Testing Technology, Chicago, Ill.) with daylight filters conforming to ASTM Practice G 155-05a (2005) (irradiance set to 0.51 W/(m²·nm) at 340 nm; chamber air temperature set to 45° C.; uninsulated black panel temperature measured at 68° C.). The exposure cycle was 102 minutes of light followed by a wet period of 18 minutes light with water spray. Changes in sealant surface appearance (e.g., crazing, pitting and chalking) were monitored periodically and rated on a None to Very Severe scale (In increasing degree of failure: N=No Failure<VSl=Very Slight Failure<Sl=Slight Failure<Sl-Mod=Slight-to-Moderate Failure<Mod=Moderate Failure<Mod-Sev=Moderate-to-Severe<Sev=Severe Failure, VSv=Very Severe Failure).

Hardness: Hardness was measured according to ASTM C 661-06 (2006), Standard Test Method for Indentation Hardness of Elastomeric Sealants by Means of a Durometer Specimens were made by gunning sealant into metal frames (with 127×38×6.4 mm inside dimensions) resting on 76×152 mm aluminum panels and striking the sealant flat with a metal straight edge. The sealant plaques were cured for one week at 23±2° C., 50±5% relative humidity, followed by two weeks at 50±2° C. Three hardness measurements were made on each sealant plaque using a Shore A durometer model CV 71200 (Shore Instrument & Mfg. Co, Inc., Freeport, N.Y.). The average of the three measurements was reported.

Adhesion: Peel adhesion was measured according to ASTM C794-06 (2006), Standard Test Method for Adhesion-in-Peel of Elastomeric Joint Sealants. Specimens were prepared by embedding a 25.4 mm wide strip of wire screen into a 3.2 mm thick layer of sealant on each of 76×152 mm glass, aluminum and concrete mortar substrates, and cured for one week at 23±2° C., 50±5% relative humidity, followed by two weeks at 50±2° C. Peel adhesion was then measured by peeling the embedded screen back from the substrate at 180° in a Tinius Olsen tensile tester (model H10K-S from Tinius Olsen Testing Machine Co., Inc., Horsham, Pa.) at 51 mm/min. The force required to peel the sealant from the substrate (in Newtons) was measured and the type of failure noted as Cohesive failure (C) or Adhesive failure (A), meaning that there is no visible residual sealant on the surface of the substrate, Dry adhesion: Two peel adhesion measurements on each of the three substrates were taken after the initial three week cure.

Wet adhesion: Two peel adhesion measurements on each of the three substrates were taken after an additional 1 week of water soak.

Aged Wet adhesion: Specimens on each of the three substrates were prepared with sealant that was aged in the cartridge for 10 days at 60° C. and then two wet peel adhesion measurements were taken on each of the three substrates. of the combined amount of adhesive plus cohesive failure in cm$^2$.

Results for Adhesion are reported as the peel value, in N, followed by the mode of failure, either Cohesive (C) or Adhesive (A) and the percentage of the failure that is adhesive. Where no indication of the percentage failure is given, the percentage of failure is 100% of the indicated mode.

Joint Movement: Joint movement was evaluated according to ASTM C-719-93 (2005), Standard Test Method for Adhesion and Cohesion of Elastomeric Joint Sealants Under Cyclic Movement (Hockman Cycle). Three 50.8 mm×12.2 mm×12.2 mm H-block specimens were prepared on glass, aluminum and concrete mortar substrates, cured for one week at 23±2° C., 50±5% relative humidity, then cured for an additional 2 weeks at 50° C., soaked in water for one week, compressed by 25% from the initial joint width, and placed into a 70° C. oven for one week. The specimens were then subjected to ten +/−25% joint movement cycles at 23±2° C., 50±5% relative humidity and at a rate of 3.2 mm/hr. Finally, the specimens were subjected to ten low temperature cycles (25% compression at 70° C., followed by 25% extension at −26° C.). The amount of failure (total adhesive plus cohesive failure, in cm$^2$, of the three specimens was reported.

Results for Joint Movement testing are reported as Pass (P) or Fail (F). Fail results are followed by a designation of where in the test failure occurred: During the water soak (H$_2$O), during the room temperature cycling (RT) or after the number of low temperature cycles. Pass results are followed by a designation of No Failure (NF) or the combined amount of adhesive plus cohesive failure in cm$^2$.

The test requirements for hardness, joint movement and adhesion are specified in ASTM Standard C920-08 (2008) Standard Specification for Elastomeric Joint Sealants and are reproduced in Table 4, below. ASTM Standard C920-08 (2008) Standard Specification for Elastomeric Joint Sealants, establishes classes of sealants that are based on the ability of a sealant to be alternately compressed and extended to a predefined proportion of its original dimensions. Class 25 sealants, for example, are able to withstand cyclic movement of +25% and −25% from the original 12.2 mm joint width dimensions. Sealants that comply with ASTM C-920 must be tested and classified according to their joint movement capability and meet the additional requirements of the specification which include, among others, hardness and adhesion.

TABLE 4

Performance Requirements

| Test | ASTM Standard | Requirement |
|---|---|---|
| Hardness | C 661 | $50 \geq x \geq 15$ |
| Joint movement | C 719 | $\leq 9$ cm$^2$ of combined adhesive plus cohesive failure |
| Adhesion | C 794 | $>22$ N and $\leq 25\%$ adhesive failure |
| Weathering | N/A | $\leq$Slight Failure (SI) after $\leq 2500$ hours, and $\leq$Moderate Failure (M) after 2500-4000 hrs |

TABLE 5

Sealant Performance for Single Acid Backbone Copolymers

| | Example # | | | |
|---|---|---|---|---|
| | E* | D* | P* | C* |
| Hardness | 24 | 25 | 43 | 30 |
| ±25% Joint Movement | | | | |
| Glass | P-0.4 | F-RT | F-H$_2$O | F-RT |
| Aluminum | P-0.4 | F-RT | F-RT | F-RT |
| Mortar | P-0.8 | F-RT | F-RT | F-RT |
| Initial Wet Adhesion (N) | | | | |
| Glass | 49 C | 31 A | 9 A | 27 A |
| Aluminum | 53 C | 27 C/A(75) | 13 C | 27 A |
| Mortar | 62 C/A(25) | 40 C | 9 C/A(25) | 4 A |
| Aged Wet Adhesion (N) | | | | |
| Glass | 62 C/A(15) | — | 4 A | — |
| Weathering | | | | |
| $\leq$2500 hrs | VSv | SI-M | N | SI-M |
| 2500-4000 hrs | VSv | — | N | — |

*Comparative

As shown in Table 5, the sealant that contains methacrylic acid (Example E-Comparative) demonstrates superior joint movement and adhesion, but has poor weathering characteristics. The sealants containing stronger acids demonstrate poor joint movement and adhesion, but good weathering characteristics.

TABLE 6

Sealant Performance Effects of Mixed MAA and AA Copolymers

| Example # | E* | X* | O | AAA | III | N | D* |
|---|---|---|---|---|---|---|---|
| Hardness ±25% Joint Movement | 24 | 28 | 31 | 28 | 30 | 27 | 25 |
| Initial Wet Adhesion (N) | | | | | | | |
| Glass | P-0.4 | P-0.8 | P-4.0 | — | — | F-RT | F-RT |
| Aluminum | P-0.4 | P-NF | P-NF | P-NF | P-NF | P-4.0 | F-RT |
| Mortar | P-0.8 | F-1 | P-2.4 | — | P-1.2 | F-6 | F-RT |
| Aged Wet Adhesion (N) | | | | | | | |
| Glass | 49 C | 62 C | 62 C | 62 C | 71 C | 49 C | 31 A |
| Aluminum | 53 C | 67 C/A(25) | 71 C | 80 C/A(75) | 67 C | 53 C | 27 C/A(75) |
| Mortar | 62 C/A(25) | 49 A | 44 A | 18 A | 49 C/A(50) | 58 C/A(50) | 40 C |
| Weathering | | | | | | | |
| Glass | 62 C/A(15) | 58 C | 71 C | 44 C/A(10) | 36 A(50) | 58 C | — |
| ≤2500 hrs | VSv | Sv | N | N | NF | N | SI-M |
| 2500-4000 hrs | VSv | VSv | M | — | — | N | — |

*Comparative

As shown in Table 6, copolymers derived from a mixture of methacrylic and acrylic acid show properties that are intermediate between those derived from the individual acids. In particular, copolymers containing mixtures of methacrylic and acrylic acid in ratios between 3:1 and 1:3 (Examples X, O, AAA, III and N) show a preferred balance of joint movement, adhesion and weathering characteristics, versus those derived from either MAA (Example E—comparative) or AA (Example D-comparative) as single backbone acids.

TABLE 7

Effect of Acid Level on Sealant Performance for Mixed MAA and AA Copolymers at Ratios of Around 3:1

| | Example | | |
|---|---|---|---|
| | AAA | CCC | DDD |
| Hardness ±25% Joint Movement | 28 | 34 | 40 |
| Initial Wet Adhesion (N) | | | |
| Glass | — | — | — |
| Aluminum | P-NF | P-NF | — |
| Mortar | — | — | F-1 |
| Aged Wet Adhesion (N) | | | |
| Glass | 62 C | 71 C | 75 C/A(15) |
| Aluminum | 80 C/A(75) | 98 C | 84 C |
| Mortar | 18 A | 31 C/A(50) | 27 A |
| Weathering | | | |
| Glass | 44 C/A(10) | 40 A | 13 A |
| ≤2500 hrs | N | N | N |
| 2500-4000 hrs | — | — | — |

As shown in Table 7, increasing the total acid level in the backbone from 2% (Example AAA) to 4% (Example DDD), while maintaining the acid ratio from between 3:1 to 1:3 for methacrylic and acrylic acid, adversely affects aged wet adhesion.

TABLE 8

Effects of MAA or AA with PEM

| Example # | E* | Q | F* | G* | C* |
|---|---|---|---|---|---|
| Hardness ±25% Joint Movement | 24 | 27 | 25 | 25 | 30 |
| Initial Wet Adhesion (N) | | | | | |
| Glass | P-0.4 | P-NF | F-RT | F-RT | F-RT |
| Aluminum | P-0.4 | P-NF | P-0.4 | F-RT | F-RT |
| Mortar | P-0.8 | P-2.8 | P-3.6 | F-RT | F-RT |
| Aged Wet Adhesion (N) | | | | | |
| Glass | 49 C | 62 C | 40 C | 22 A | 27 A |
| Aluminum | 53 C | 62 C | 40 C/A(10) | 27 C/A(70) | 27 A |
| Mortar | 62 C/A(25) | 44 C | 27 C | 27 C/A(50) | 4 A |
| Weathering | | | | | |
| Glass | 62 C/A(15) | 58 C | 9 A | — | — |
| ≤2500 hrs | VSv | N | M | SI-M | SI-M |
| 2500-4000 hrs | VSv | SI | — | — | — |

*Comparative

As shown in Table 8, copolymers containing mixtures of methacrylic acid and phosphoethylmethacrylate (PEM) (Examples Q and G) show improved properties which compared to copolymers containing either acid alone (Examples E and C). In particular, copolymers containing mixtures of methacrylic and phosphoethylmethacrylate (PEM) in ratios greater than 2.2:1 show a preferred balance of joint movement, adhesion and weathering characteristics (Example Q). Example G and Example F (1.5 carboxylic acid to 0.8 PEM) shows that copolymers containing mixtures of carboxylic acid and PEM show poor performance at similar ratios.

TABLE 9

Itaconic Acid (IA)-Containing Binders

| | Example # | | |
|---|---|---|---|
| | U | P | GG |
| Hardness ±25% Joint Movement | 23 | 43 | 30 |
| Glass | F-RT | F-H$_2$O | P-5.6 A/C |
| Aluminum | F-RT | F-RT | P-NF |
| Mortar | F-RT | F-RT | F-6 |
| Initial Wet Adhesion (N) | | | |
| Glass | 18 C/A(40) | 9 A | 44 C |
| Aluminum | 18 C/A(80) | 13 C | 44 C/A(20) |
| Mortar | 9 C | 9 C/A(25) | 31 C |
| Aged Wet Adhesion (N) | | | |
| Glass Weathering | 18 C/A(50) | 4 A | 44 C/A(40) |
| ≤2500 hrs | N | N | VSv |
| 2500-4000 hrs | SI | N | VSv |

As shown in Table 9, copolymers derived from itaconic acid alone (Examples U and P) show poor adhesion and joint movement properties, irrespective of level. However, as shown in Example GG, when used in combination with methacrylic acid at ratios greater than 6:1 MAA:IA, joint movement and adhesion can be improved.

As shown in Table 10, below, in copolymers in which acrylic acid is used as the sole acid (Example W (0.75 AA), and Example R (1.25 AA)), the addition of HEMA significantly improves joint movement and wet adhesion to glass, without compromising weathering characteristics. The addition of HEMA is optimally effective at levels 5% and below (Examples OO, PP, and MM), but still improves adhesion at levels above 5% (compare Example QQ versus Examples W and R).

TABLE 10

HEMA Ladder with 1 AA

| Example # | W* | R | OO | PP | MM | QQ* |
|---|---|---|---|---|---|---|
| Hardness ±25% Joint Movement | | 23 | 27 | 32 | 30 | 37 |
| Glass | — | F-RT | P-NF | P-NF | P-NF | P-NF |
| Aluminum | — | F-RT | P-NF | P-NF | P-NF | F-H$_2$O |
| Mortar | — | P-4.4 | P-NF | P-NF | P-1.2 | F-2 |
| Initial Wet Adhesion (N) | | | | | | |
| Glass | 31 C/A(50) | 27 A | 58 C | 58 C | 58 C | 40 C |
| Aluminum | 31 C/A(75) | 31 A | 27 A | 27 A | 31 A | 22 A |
| Mortar | 13 A | 27 A | 58 C/A(25) | 18 C/A(75) | 44 C/A(20) | 22 C/A(75) |
| Aged Wet Adhesion (N) | | | | | | |
| Glass Weathering | — | 31 C/A(50) | 62 C | 53 C/A(40) | 62 C | 44 C/A(20) |
| ≤2500 hrs | N | N | N | N | N | N |
| 2500-4000 hrs | — | — | — | — | — | — |

TABLE 11

HEMA Ladder with 1.25 and 1.5 AA

| Example # | R | S | T | V | NNN | KKK |
|---|---|---|---|---|---|---|
| Hardness ±25% Joint Movement | 23 | 23 | 21 | 25 | 26 | 25 |
| Glass | F-RT | F-4 | P-4.4 | P-0.8 | — | — |
| Aluminum | F-RT | F-8 | P-1.2 | P-NF | P-NF | P-NF |
| Mortar | P-4.4 | P-6.0 | P-2.4 | P-2.4 | — | P-1.2 |
| Initial Wet Adhesion (N) | | | | | | |
| Glass | 27 A | 40 C/A(50) | 44 C | 53 C | 62 C | 67 C |
| Aluminum | 31 A | 40 C | 44 C/A(20) | 53 C | 58 C | 58 C/A(25) |
| Mortar | 27 A | 36 A | 49 C/A(25) | 58 C/A(40) | 44 C/A(90) | 40 A |
| Aged Wet Adhesion (N) | | | | | | |
| Glass Weathering | 31 C/A(50) | 40 C | 44 C | 44 C | 58 C | 53 C |
| ≤2500 hrs | N | N | N | N | N | N |
| 2500-4000 hrs | — | — | — | — | — | — |

As shown in Table 11, above, the same benefits of HEMA are observed at acrylic acid levels of (1.25-1.5%), compare Example W in Table 10. While the benefits for aged wet adhesion to glass can be seen at HEMA levels as low as 1% (Example S), higher levels of HEMA at 3% in Example V show improved joint movement.

TABLE 12

Binders that Combine HEMA with Single Backbone Acids (MAA, AA, and IA)

| Example # | E* | I | D* | K | U* | KK* |
|---|---|---|---|---|---|---|
| Hardness ±25% Joint Movement | 24 | 33 | 25 | 31 | 23 | 26 |
| Initial Wet Adhesion (N) | | | | | | |
| Glass | P-0.4 | P-0.4 | F-RT | F-RT | F-RT | F-H$_2$O |
| Aluminum | P-0.4 | P-0.8 | F-RT | P-6.4 | F-RT | F-RT |
| Mortar | P-0.8 | P-6.8 | F-RT | P-2.4 | F-RT | F-RT |
| Aged Wet Adhesion (N) | | | | | | |
| Glass | 49 C | 84 C | 31 A | 58 C | 18 C/A(40) | 18 C |
| Aluminum | 53 C | 84 C/A(10) | 27 C/A(75) | 58 C | 18 C/A(80) | 22 C |
| Mortar | 62 C/A(25) | 75 C/A(25) | 40 C | 71 C | 9 C | 4 C |
| Weathering | | | | | | |
| Glass | 62 C/A(15) | 62 C/A(10) | — | 40 C | 18 C/A(50) | 22 C |
| ≦2500 hrs | VSv | M-Sv | SI-M | N | N | N |
| 2500-4000 hrs | VSv | — | — | — | SI | N |

As shown in Table 12, the addition of HEMA to copolymers containing a single copolymerized backbone acid generally improves adhesion and weathering and (compare Examples I with comparative Example E; compare Example K and comparative Example D), in the case of the acrylic acid containing copolymer in Example K, also improves joint movement performance versus comparative Example D.

As shown in Table 13, below, for copolymers with mixed acid backbones (at ratios of 7:1 MAA:AA) the addition of HEMA improves weathering in Example Y as compared to comparative Example X, without compromising adhesion and joint movement. The addition of chain transfer agent (compare Example AA and Z) has essentially no effect on measured properties.

TABLE 13

HEMA Ladder with Mixed Acid Binders (1.75 MAA/0.25 AA)

| Example | X* | Y | Z | AA | BB |
|---|---|---|---|---|---|
| Hardness ±25% Joint Movement | 28 | 27 | 27 | 30 | 32 |
| Initial Wet Adhesion (N) | | | | | |
| Glass | P-0.8 | P-NF | P-NF | P-NF | P-NF |
| Aluminum | P-NF | P-NF | P-NF | P-NF | P-NF |
| Mortar | F-1 | P-3.6 | F-1 | F-2 | F-2 |
| Aged Wet Adhesion (N) | | | | | |
| Glass | 62 C | 84 C | 75 C | 93 C | 84 C |
| Aluminum | 67 C/A (25) | 84 C/A (10) | 58 C/A (60) | 44 A | 53 A |
| Mortar | 49 A | 84 C/A (50) | 89 C/A (30) | 84 C/A(50) | 80 C/A (40) |
| Weathering | | | | | |
| Glass | 58 C | 62 C | 62 C | 71 C | 80 C |

TABLE 13-continued

HEMA Ladder with Mixed Acid Binders (1.75 MAA/0.25 AA)

| Example | X* | Y | Z | AA | BB |
|---|---|---|---|---|---|
| Weathering | | | | | |
| ≦2500 hrs | SI-M | SI-M | VSI-SI | VSI | SI |
| 2500-4000 hrs | Sv | M-Sv | SI | VSI | SI |

*Comparative

TABLE 14

HEMA Ladder with Mixed Acid Binders (1.5 MAA/0.5 AA)

| Example # | TT | UU | VV | WW | XX* |
|---|---|---|---|---|---|
| Hardness ±25% Joint Movement | 35 | 34 | 40 | 40 | 44 |
| Initial Wet Adhesion (N) | | | | | |
| Glass | P-NF | P-NF | P-NF | P-NF | F-2 |
| Aluminum | P-NF | P-NF | P-NF | P-NF | F-2 |
| Mortar | F-5 | F-5 | F-1 | F-1 | F-1 |
| Aged Wet Adhesion (N) | | | | | |
| Glass | 53 C | 75 C | 62 C | 53 C | 44 C |
| Aluminum | 40 A | 53 A | 35 A | 22 A | 22 A |
| Mortar | 53 C/A(50) | 58 C/A(50) | 62 C/A(40) | 44 C/A(50) | 31 C/A(50) |
| Weathering | | | | | |
| Glass | 53 C | 62 C | 53 C | 49 C | 40 A(60) |
| ≦2500 hrs | N | N | N | N | N |
| 2500-4000 hrs | — | — | — | — | — |

*Comparative

As shown in Table 14, for copolymers with mixed acid backbones (at ratios of 3:1 MAA:AA), an increase in the level of HEMA from 2% (Example TT) to 5% (Examples W and WW) does not impair joint movement performance, adhesion or weathering. However, increasing HEMA further to 10% (Example XX) reduces joint movement performance and aged adhesion, suggesting a upper limit of HEMA efficacy. The addition of higher levels of MMA to the copolymer backbone (compare Example UU to Example TT) has no affect on measured sealant properties.

TABLE 15

Acid Ladder in HEMA Containing Copolymers at Ratios of 5:3 to 3:1 MAA:AA

| | Example # | | | |
|---|---|---|---|---|
| | BBB | EEE | FFF | HHH |
| Hardness ±25% Joint Movement | 26 | 37 | 45 | 32 |
| Initial Wet Adhesion (N) | | | | |
| Glass | P-NF | — | F-10 | — |
| Aluminum | P-NF | P-NF | F-7 | P-NF |
| Mortar | P-1.2 | F-3 | F-1 | P-1.2 |
| Aged Wet Adhesion (N) | | | | |
| Glass | 62 C | 75 C | 93 C | 71 C |
| Aluminum | 58 A | 98 C | 67 C/A(20) | 62 C/A(30) |

TABLE 15-continued

Acid Ladder in HEMA Containing Copolymers at Ratios of 5:3 to 3:1 MAA:AA

| | Example # | | | |
|---|---|---|---|---|
| | BBB | EEE | FFF | HHH |
| Mortar Aged Wet Adhesion (N) | 35 A | 35 A | 49 C/A(25) | 58 C/A(25) |
| Glass Weathering | 67 C | 53 A | 18 A | 53 C/A(25) |
| ≦2500 hrs | N | N | N | N |
| 2500-4000 hrs | — | — | — | — |

As shown in Table 15, for HEMA containing copolymers with mixed acid backbones (at ratios of 5:3 MAA:AA and 3:1 MAA:AA), increasing the total acid level in the backbone from 2.0% (Example BBB) to 4.0% (Example FFF), adversely affects joint movement performance. Hence, preferred aqueous binder copolymers have a total backbone acid content of 3.0 wt. % or less copolymerized monomer, based on total monomer weight.

As shown in Table 16, below, the inventive compositions containing a 1:3 ratio of MAA:AA backbone acids and 2% HEMA, generally perform well, in terms of joint movement and initial wet adhesion across the substrates on interest, and all show exceptional weathering, essentially regardless of post-polymerization additives. In this compositional space, the addition of chain transfer agents (see Examples GGG and LLL versus others) also further improves initial wet adhesion to mortar, while maintaining all other sealant performance attributes.

TABLE 16

The Effects of Post-Polymerization Additives on Sealant Performance for HEMA-Containing Binders

| Copolymer | GGG | JJJ | OOO | LLL | NNN | KKK |
|---|---|---|---|---|---|---|
| Hardness ±25% Joint Movement | 29 | 25 | 30 | 32 | 26 | 25 |
| Glass | P-NF | P-2.4 | — | — | — | — |
| Aluminum | P-NF | P-NF | P-NF | P-NF | P-NF | P-NF |
| Mortar Initial Wet Adhesion (N) | P-1.6 | P-2.4 | P-NF | F-5 | — | P-1.2 |
| Glass | 67 C | 53 C | 67 C | 75 C | 62 C | 67 C |
| Aluminum | 62 C | 67 C | 67 C/A(10) | 58 C | 58 C | 58 C/A(25) |
| Mortar Aged Wet Adhesion (N) | 71 C | 71 C/A(10) | 35 A | 49 C/A(80) | 44 C/A(90) | 40 A |
| Glass Weathering | 53 C | 49 C | 53 C | 62 C | 58 C | 53 C |
| ≦2500 hrs | N | — | N | N | N | N |
| 2500-4000 hrs | — | — | — | — | — | — |

TABLE 17

HEMA Ladder with Mixed Acid Binders (1.5 MAA/0.25 IA)

| | Copolymer | | | |
|---|---|---|---|---|
| | GG* | HH | II | JJ |
| Hardness ±25% Joint Movement | 30 | 27 | 28 | 29 |
| Glass | P-5.6 | P-0.4 | P-1.2 | P-NF |
| Aluminum | P-NF | P-NF | P-0.4 | P-0.8 |
| Mortar Initial Wet Adhesion (N) | F-6 | P-8.9 | F-4 | P-7.3 |
| Glass | 44 C | 40 C | 49 C | 44 C |
| Aluminum | 44 C/A(20) | 44 C/A(25) | 44 C/A(10) | 40 C/A(60) |
| Mortar Aged Wet Adhesion (N) | 31 C | 35 C | 27 C | 22 C |
| Glass Weathering | 44 C/A(40) | 53 C | 44 C | 49 C |
| ≦2500 hrs | VSv | M-Sv | Sl-M | VSl |
| 2500-4000 hrs | VSev | Sev | Mod | VSl-Sl |

*Comparative

As shown in Table 17, above, for copolymers with mixed acid backbones (at ratios of 6:1 MAA:1A), the addition of HEMA in Examples HH, II and JJ (which have levels of HEMA increasing from 1.0 to 3.0%) improves weathering and aged wet adhesion to glass without compromising initial adhesion or joint movement performance when compared to Example GG (0% HEMA).

TABLE 18

Silane Ladder in Formulation

| Copolymer | H | I | J | K | L | M |
|---|---|---|---|---|---|---|
| Silane Level (wt. % of solids) | 0.03 | 0.06 | 0.09 | 0.03 | 0.06 | 0.09 |
| Hardness ±25% Joint Movement | 30 | 33 | 33 | 31 | 31 | 35 |
| Glass | P-NF | P-0.4 | P-NF | F-RT | F-RT | F-RT |
| Aluminum | P-0.4 | P-0.8 | P-0.4 | P-6.4 | P-1.6 | P-6.8 |
| Mortar Initial Wet | P-1.2 | P-6.8 | P-2.4 | P-2.4 | P-7.3 | P-4.4 |

TABLE 18-continued

Silane Ladder in Formulation

| Copolymer | H | I | J | K | L | M |
|---|---|---|---|---|---|---|
| Adhesion (N) | | | | | | |
| Glass | 84 C | 84 C | 84 C | 58 C | 58 C | 62 C |
| Aluminum | 75 C/A(10) | 84 C/A(10) | 75 C/A(30) | 58 C | 62 C | 62 C |
| Mortar | 44 C/A(90) | 75 C/A(25) | 75 C/A(20) | 71 C | 58 C | 53 C |
| Aged Wet Adhesion (N) | | | | | | |
| Glass | 67 C/A(10) | 62 C/A(10) | 67 C | 40 C | 40 C | 49 C |
| Weathering | | | | | | |
| ≦2500 hrs | M-Sv | M-Sv | M-Sv | N | N | N |
| 2500-4000 hrs | — | — | — | — | — | — |

As shown in Table 18, sealant performance is essentially independent of the organosilane level used in the formulation. Joint Movement and aged wet adhesion to glass tend to benefit the same amount from small amounts of the Silane as from larger amounts.

TABLE 19

Copolymers with Hydroxyl and Acid Groups in EHA copolymers

| | Copolymer | | |
|---|---|---|---|
| | CC | DD | EE |
| Hardness | 25 | 18 | 21 |
| ±25% Joint Movement | | | |
| Glass | P-NF | P-NF | P-NF |
| Aluminum | P-NF | P-0.4 | P-0.4 |
| Mortar | F-10 | P-0.4 | P-0.4 |
| Initial Wet Adhesion (N) | | | |
| Glass | 67 C | 67 C | 80 C |
| Aluminum | 44 A | 31 A | 36 A |
| Mortar | 44 A | 58 A | 67 C/A(50) |
| Aged Wet Adhesion (N) | | | |
| Glass Weathering | 58 C | — | — |
| ≦2500 hrs | N | N | N |
| 2500-4000 hrs | N | N | N |

As shown in Table 19, copolymers with mixtures of hydroxyl groups and acid groups on the backbone exhibit good weatherability and acceptable initial wet adhesion to glass. Example CC exhibited acceptable aged wet adhesion to glass and comprised an aqueous binder copolymer with a harder backbone, with 2 wt. % copolymerized acid, thereby outperforming Examples DD and EE which had less hardness and 1 wt. % copolymerized acid.

We claim:

1. An aqueous caulk or sealant composition that is substantially free of any plasticizer comprising:
   (i) an aqueous binder of one or more copolymer chosen from:
      a mixed backbone acid copolymer copolymerized from methacrylic acid (MAA) and a second acid monomer having a lower pKa than methacrylic acid and chosen from a monocarboxylic acid, dicarboxylic acid, phosphorus acid, sulfur acid, and mixtures thereof, the MAA and the second acid monomer being copolymerized in the amount of from 0.1 to 5.0 wt. %, based on total copolymerized monomer weight; a copolymer having a mixture of backbone acid and hydroxyl groups copolymerized from 0.5 to 7.5 wt. %, based on total copolymerized monomer weight, of one or more hydroxyl group containing monomer and from 1.0 to 5.0 wt. %, based on total copolymerized monomer weight, of one or more acidic monomer chosen from MAA and the second acid monomer; and copolymer mixtures thereof, wherein the copolymer has a glass transition temperature ($T_g$) of −25° C. or less; and,
   further wherein, the aqueous binder copolymer has a solids content of 50 wt. % or higher, based on the total weight of the aqueous binder copolymer;
   (ii) one or more filler in a filler to binder ratio of from 0.25:1 to 4:1; and,
   (iii) water.

2. The composition as claimed in claim 1, wherein the one or more aqueous binder copolymer has a $T_g$ of −30° C. or less.

3. The composition as claimed in claim 1, wherein aqueous binder is copolymerized from a total of 3.0 wt. % or less of acid monomers, based on total monomer weight.

4. The composition as claimed in claim 1, wherein the aqueous binder is copolymerized from no more than one second acid monomer which is chosen from phosphorus acid and sulfur acid.

5. The composition as claimed in claim 1, wherein the aqueous mixed backbone acid copolymer is chosen from one copolymerized from a mono- or di-carboxylic acid as the second acid monomer in a weight ratio of the MAA to the second acid monomer ranging from 5.5:1 to 1:5, one copolymerized from sulfur acid or phosphorus acid monomer as the second acid monomer in a weight ratio of the MAA to the second acid monomer ranging from 9:1 to 2.2:1, mixtures thereof, and mixtures thereof with copolymers having a mixture of backbone acid and hydroxyl groups.

6. The composition as claimed in claim 1, wherein the aqueous binder is chosen from a copolymer having a mixture of backbone acid and hydroxyl groups copolymerized from hydroxyl group containing monomer to acidic monomer in a monomer weight ratio ranging from 5:1 to 1:5, more than one such copolymer and mixtures thereof with mixed backbone acid copolymer.

7. The composition as claimed in claim 1, wherein the aqueous binder copolymer has a solids content of 60 wt. % or higher.

8. The composition as claimed in claim 1, further comprising one or more organosilane adhesion promoter.

9. The composition as claimed in claim 8, wherein the composition exhibits at least one of the aged wet adhesion to glass, aluminum and concrete mortar and the joint movement capability required by the ASTM C-920, class 25 specification.

10. The composition as claimed in claim 1 which is essentially free of tackifiers.

11. A method of using the composition as claimed in claim 1 comprising applying the aqueous caulk and sealant to a substrate chosen from glass, mortar, aluminum, wood, painted surfaces, combinations thereof, joints therein, seams therein, gaps therein, joints between substrate pieces and gaps between substrate pieces.

* * * * *